United States Patent Office 2,758,803
Patented Aug. 14, 1956

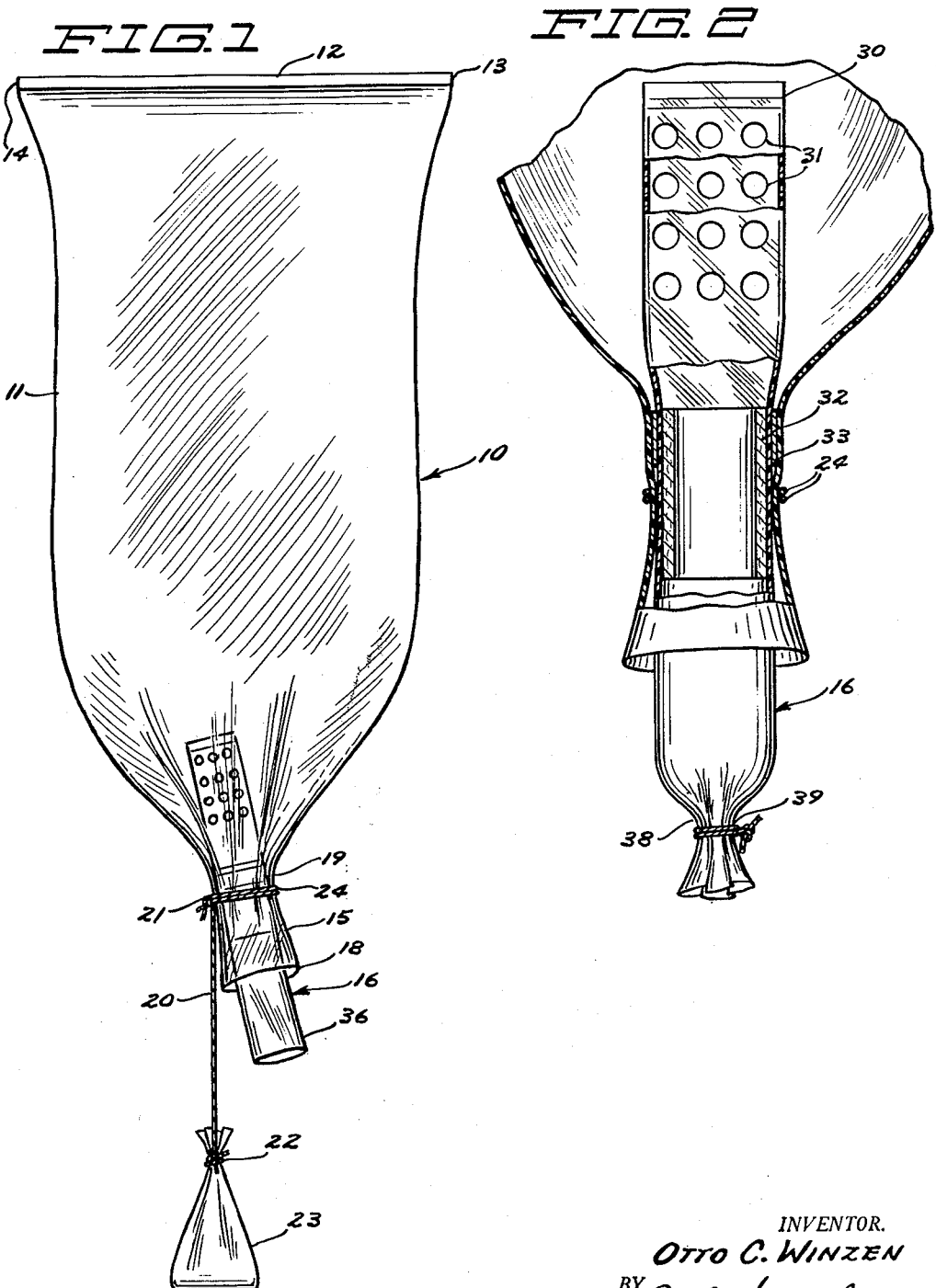

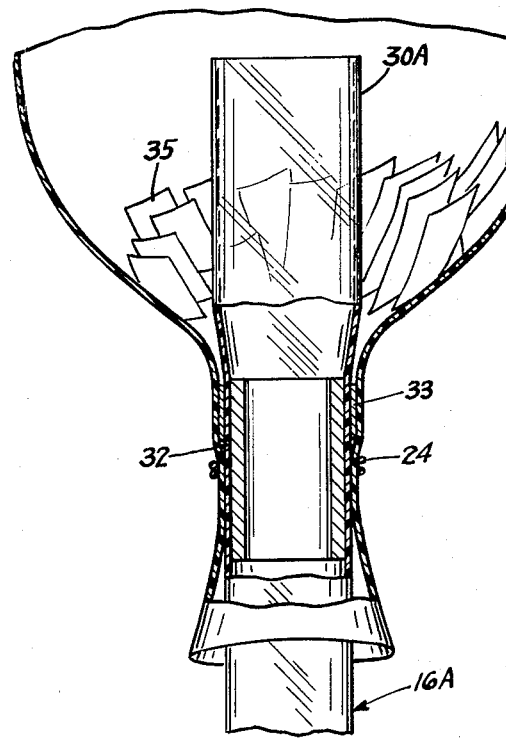
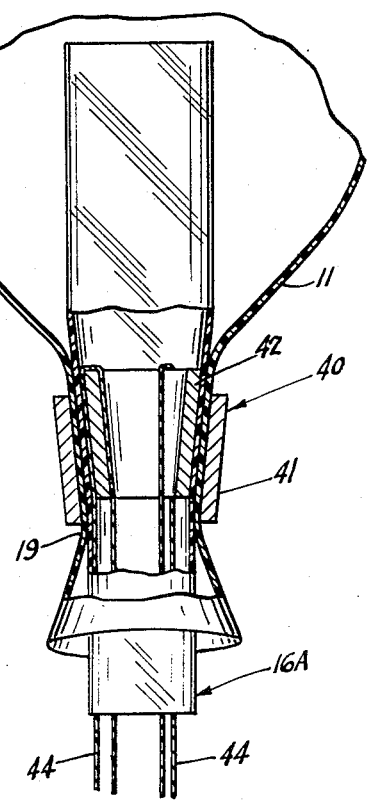
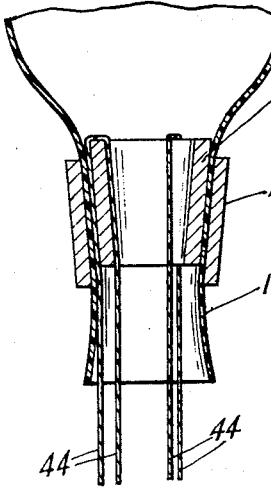

2,758,803

BALLOON

Otto C. Winzen, Mendota Township, Dakota County, Minn., assignor to Winzen Research, Inc., Minneapolis, Minn., a corporation of Minnesota Application August 19, 1954, Serial No. 450,977

13 Claims. (Cl. 244—31)

This invention relates to balloons and more specifically relates to small balloons of the expendable type.

In modern day useage, balloons have become very important for the dissemination of propaganda messages, for use as targets for airplane and other gunnery fire, for use as meteorological sounding devices to determine various weather conditions, for use in warfare as a vehicle for transporting various types of incendiaries, and for use in the seeding of clouds for rain-making, etc.

It has therefore become extremely important to provide a small expendable or disposable balloon, of inexpensive manufacture, yet of excellent performance which is suitable for use in such varied operations. Disposability is particularly important, for, in most of these operations, the balloons are utilized in large numbers, and there is no way of recovering them once they have been released.

It is therefore an object of this invention to provide a new and useful versatile balloon which may be readily and inexpensively produced, yet is suitable for use in varied operations.

It is a further object of this invention to provide a new and useful balloon comprised essentially of a section of tubular material.

It is still a further object of this invention to provide a new and useful balloon which may be utilized as an appendix balloon, or as a displacement balloon and which has provision whereby a load may be carried externally or internally of the balloon envelope.

Still another object of this invention is the provision of a balloon comprising a section of synthetic resinous tubular material which may be heat sealed at one end and having means for readily securing an inflation tube at the other end.

Still a further object of this invention resides in the provision of a new and useful inflation tube in cooperation with a balloon envelope.

Another object of this invention resides in the provision of a new and useful inflation tube comprising a stiffening section and optionally including a baffle means for dispersing gas with a balloon envelope, said inflation tube being adapted for cooperation with the balloon envelope, whereby the envelope may readily and releasably be secured thereto.

Still a further object of the invention resides in the provision of a new and useful appendix confine for a balloon envelope.

Other and further objects of the invention resides in the structural details of my balloon envelope, in the structural details of my inflation tube, the cooperation of the two, in the means used to secure the inflation tube to the envelope, and in the structural details of my appendix confine.

Other and further objects of the invention are those inherent and apparent in the apparatus as described, illustrated and claimed.

To the accomplishment of the foregoing and related ends, this invention then comprises the features herein-after fully described and particularly pointed out in the claims, the following description setting forth in detail certain illustrative embodiments of the invention, these being indicative, however, of but a few of the various ways in which the principles of the invention may be employed.

This invention will be illustrated with reference to the drawings in which corresponding numerals refer to the same parts and in which:

Figure 1 is an elevational view of my invention used as an appendix balloon;

Figure 2 is a fragmentary vertical sectional view of the balloon envelope of Figure 1, showing the details of my inflation member and showing a modified useage of my balloon as a displacement balloon;

Figure 3 is a view similar to Figure 2 but showing a modified form of my inflation member;

Figure 4 is a view similar to Figure 3 but showing my appendix confine as an alternative means for securing my inflation member in position with relation to the balloon envelope; and Figure 5 is a fragmentary vertical sectional view showing my confine used without my inflation member.

Referring now to the drawings, and particularly to Figure 1, my balloon generally designated 10 is shown as comprising an envelope 11 of generally tubular cross-section. In actual practice, elongated units of polyethylene of tubular cross-section are cut into segments to form these envelopes.

While polyethylene is conventionally used, other materials may be substituted, such as other synthetic resinous materials and the envelope need not be of tubular cross-section, although this is the most practical and inexpensive form to use.

After the tube is severed to form a section, one end of the section is then heat sealed adjacent the edge 12, providing a pair of corners 13 and 14, and forming a member in the shape of a flat-type bag or envelope. The open end 15 of the envelope is then gathered around my inflation member, generally designated 16, so as to provide a mouth 18, and a neck 19 in contact with the member 16. The neck 19 is securely fastened around the inflation tube 16 by a flexible wire or cord means 20 having an end 21 looped and tied around the neck 19 and a second end 22 tied to a load 23. In Figure 1, the load 23 is illustrated as a sack of polyethylene containing a plurality of leaflets or messages, or any other desired load. In actual practice, however, the sack may be dispensed with and any desired load may be secured to the cable means 20. If preferred, the cable 20 may be severed adjacent end 21 providing only the loops 24 for securing the neck 19 to member 16, and the pay load placed within the interior of envelope 11, as will be explained with reference to Figure 2.

Referring now to Figure 2, it will be seen that my inflation member 16 comprises a tubular section of polyethylene or other suitable material of substantially smaller cross-section than the envelope 11. One end of the tubular section is sealed at 30, thus providing an elongated sack and a plurality of apertures 31 are provided adjacent the sealed end for directing the flow of gas into the interior of the envelope 11. A cylindrical reinforcing member 32, having a diameter slightly smaller than the diameter of the member 16, is positioned interior of member 16, as shown. In this particular instance, the member 32 is made of cardboard, but it is understood that other rigid or semi-rigid stiffening members such as rigid synthetic resinous materials, lightweight metals, or other materials may be used without departing from the spirit and scope of the invention, and that the shape may be other than cylindrical. A strip of pressure sensitive tape 33 is positioned around the periphery of member 16 and over member 32 to gather the member 16 securely in position about member 32.

The neck 19 of envelope 11 is then secured to member 16 by loops 24 of end 21 of cord 20, which overlie the member 32, as shown in Figures 1 and 2. Thus, members 20 and 32 serve to provide a confine for the neck 19 of my envelope and to position the inflation member 16 thereon. As will be appreciated, in some instances, if desired, member 16 may be dispensed with and neck 19 secured directly to member 32 by member 20.

When it is desired to fly my balloon as an open appendix balloon, the external end 36 of the member 16 is allowed to remain open and unsecured as shown in Figure 1. When it is desired to fly my balloon as a diplacement balloon, the external end 36 of member 16 is gathered to provide a neck or closure 38 about which a retaining means 39, in this case a plurality of loops of cord, is positioned.

Thus, with reference to Figure 1, there is shown an open appendix balloon (having an external load), and with reference to Figure 2, there is shown a displacement balloon.

When it is desired to inflate the balloon, an end of an inflation hose is inserted in member 16, gas flows through member 16 and is rapidly injected into the balloon envelope 11 in all directions through apertures 31.

After the balloon is inflated, it may be utilized as an open appendix balloon as shown in Figure 1, or the closure means 39 may be utilized to provide the displacement balloon, as shown in Figure 2.

Reference is now made to Figure 3 wherein a slightly modified inflation member 16A is shown and a plurality of leaflets or other messages 35 is positioned within the envelope 11. Thus, where it is desired to provide an internal load for the balloon, usually comprising leaflets or other printed matter, they are positioned substantially as shown. While it is to be understood that the leaflets 35 may be inserted in the balloon envelope, as for example by inverting the envelope so that the end 12 is downward, inserting the envelope, inserting a member 16 or 16A, securing it to the neck 19 by cord 20, and then turning the envelope 11 to the position of Figures 1 and 3 wherein the leaflets 35 will assume the position shown in Figure 3, I prefer, in distinction to this, to use my modified inflation member 16A in which the apertures 31 are omitted and the end 30A positioned interior of the balloon envelope is not sealed.

Therefore, with the modified inflation member 16A shown in Figure 3, I may insert the members in to the inflation member after it has been secured to the balloon envelope by stuffing them upwardly through the cylindrical reinforcing member 32, until they emerge from end 30A of the inflation member. While I have found it preferred to enclose the end of the inflation member 16A as shown in Figure 2 with reference to member 16, it is possible to position a limited amount of leaflets 35 (or other small internal load) within the envelope of the balloon and transmit them within the balloon without so closing the bottom of member 16A.

Referring now to Figures 4 and 5, there is shown a confine generally designated 40 comprising cooperating members 41 and 42, which may be used as a substitute for the confine provided by reinforcing member 32, and cord member 20. If desired, it may be used in cooperation with an inflation tube as shown in Figure 4, or it may be used solely to provide an appendix as shown in Figure 5.

With specific reference to Figure 4, there is shown a first hollow reinforcing member or circlet 42 of suitable stiff material and having a slight tapered or conical exterior surface. A cooperating stiff circlet 41 of slightly larger diameter and having a cooperative tapered or conical interior surface is provided for securing the inflation member 16A in the bottom envelope 11, and confining it in juxtaposition to provide an appendix as shown in Figure 4. To place the inflation member 16A and the envelope in the position of Figure 4, the bottom of the envelope is first gathered to form the neck 19, the inflation member 16A with the stiffening member positioned therein inserted to the position of Figure 4, and the member 41 positioned around the neck 43 and jammed upwardly until by frictional engagement it is maintained in position with respect to member 42.

In order to maintain member 42 in position while the member 41 is being frictionally engaged therewith, a plurality of cord or cable members 44 are provided as shown, which are grasped to hold member 42 in position while member 41 is engaged therewith. After members 41 and 42 have cooperated to form the confine of Figure 4, the cords 44 may be severed and the bottom of the inflation member, such as 16A, secured as shown in Figure 2, if desired. On the other hand, the cords 44 may be allowed to remain in the position of Figure 4, and utilized for attachment to a load by a load ring or other means and for the supporting of the load. As will be appreciated, the taper of members 41 and 42 may be reversed (top to bottom) if desired.

By referring now to Figure 5, it will be seen that the members 42 and 41 may be used without the inflation member 16 or 16A. In this useage the balloon envelope 11 is gathered to provide neck 19, member 42 positioned interior thereof and held in position by gas from the cables 44, and member 41 is then jammed or wedged onto member 42 with the envelope 43 therebetween, firmly securing the neck 43 to the envelope and maintaining the bottom portion of the balloon envelope 11 gathered as a neck.

As will be readily apparent, my balloon is of inexpensive construction, and therefore readily disposable, provides facility and ease of operation and may be readily manipulated and launched under any circumstances not necessitating elaborate equipment.

As many widely differing embodiments of this invention may be utilized without departing from the spirit and scope thereof, it is to be understood that I do not specifically limit myself to the embodiment disclosed herein.

What I claim is:

1. A balloon comprising in combination a polyethylene bag envelope having a seamless side wall of substantially constant diameter, one end of the bag being heat sealed at approximately right angles to the side wall to form an end, and the other end of the bag opposite said sealed end being open, an inflation member of substantially smaller diameter than the diameter of said envelope positioned to extend within said opened end, said open end being gathered to form a neck, said neck being in abutment with the periphery of said inflation member and said inflation member including a cylindrical reinforcing means.

2. The device of claim 1 further characterized in that said inflation member comprises a cylindrical reinforcing means.

3. The device of claim 1 further characterized in that said inflation member comprises a flexible tube having a cylindrical rigid reinforcing member enclosed therein.

4. The device of claim 3 further characterized in that said tube is sealed at one end and is provided with a plurality of apertures adjacent said sealed end.

5. The device of claim 1 further characterized in that said means securing said envelope to said inflation member comprises a flexible cord means.

6. The device of claim 1 further characterized in that said means securing said envelope to said inflation member comprises a flexible cord having one end tied around the exterior of said envelope adjacent said open end and drawing said envelope into abutment with said inflation member and a pay load secured to the other end of said flexible cord.

7. The device of claim 1 further characterized in that said inflation member comprises a flexible tube closed at both ends when the balloon is inflated.

8. In a balloon the improvement comprising a cylindrical inflation tube having a short rigid cylindrical reinforcing member enclosed within an elongated flexible tubular portion, said flexible tubular member being flattened and sealed on one end and provided with a plurality of apertures adjacent thereto.

9. The device of claim 8 further characterized by said tubular member having the walls thereof drawn into abutment to provide a closure adjacent said other end.

10. In a balloon, the improvement comprising a portion of the envelope of said balloon being gathered to form a neck, an annular reinforcing member having a slight exterior taper positioned interior of said neck, a second annular member having a cooperating slight exterior taper positioned on the exterior of said neck in frictional engagement with the exterior of said envelope whereby the interior of said envelope is frictionally positioned with respect to said interior annular member and an inflation member of substantially tubular cross-section positioned between said interior of said envelope and the exterior of said first annular member.

11. The article of claim 10 further characterized by cable means secured to said interior annular member and extending downwardly through said neck.

12. A balloon comprising a tubular section of flexible, inelastic, thermoplastic synthetic resinous material, heat-sealed at one end at substantially right angles to the elongation thereof, the other end of said tubular section being drawn to form a neck of small diameter with reference to the diameter of said tubular member, and said drawn end of said envelope being secured in gathered position to form said neck whereby said balloon envelope is provided with a plurality of decreasingly gathered or puckered portions extending from said neck to the diameter of said balloon envelope.

13. A balloon comprising a bag envelope having a side wall of substantially constant diameter, one end of said envelope being sealed at substantially right angles to the side wall to form an end, the other end of said envelope opposite said closed end being open, said envelope being gathered to form a neck, an inflation member of substantially smaller diameter than the diameter of said envelope being positioned to extend within said open end, said gathered neck being in abutment with the periphery of said inflation member, and means securing said neck to said inflation member, whereby said envelope is provided with a plurality of decreasingly gathered or puckered portions extending from said neck to the diameter of said balloon envelope.

References Cited in the file of this patent

UNITED STATES PATENTS

| | | |
|---|---|---|
| 898,105 | Herbst | Sept. 8, 1908 |
| 1,169,804 | Gregory | Feb. 1, 1916 |
| 1,300,640 | Pasternak | Apr. 15, 1919 |
| 1,445,878 | Faber | Feb. 20, 1923 |
| 2,025,475 | Robbins | Dec. 24, 1935 |
| 2,355,610 | Tuggle | Aug. 15, 1944 |
| 2,553,941 | Raab | May 22, 1951 |
| 2,666,600 | Huch | Jan. 19, 1954 |
| 2,681,774 | Winzen | June 22, 1954 |

FOREIGN PATENTS

| | | |
|---|---|---|
| 17,027 | Great Britain | 1895 |
| 571,438 | France | Feb. 1, 1924 |
| 808,214 | Germany | July 12, 1951 |
| 854,768 | Germany | Nov. 6, 1952 |